Dec. 18, 1934.  G. L. SHERWOOD ET AL  1,984,385
METHOD OF MAKING COMPOSITE METAL BEARING PLATES
Filed Nov. 5, 1931  2 Sheets-Sheet 1
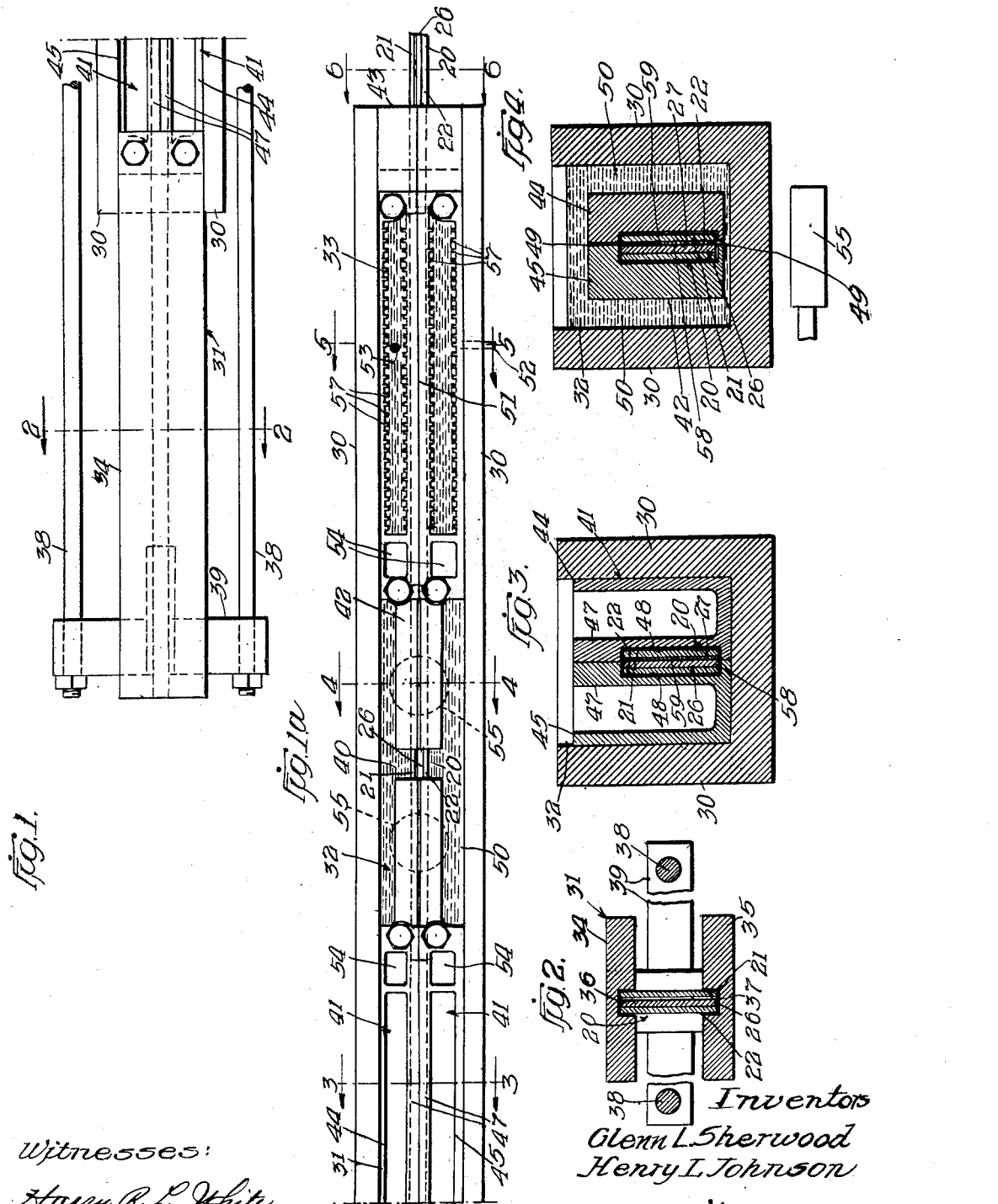
Witnesses:
Harry R. L. White
Inventors
Glenn L. Sherwood
Henry L. Johnson
By Edward Fay Wilson atty.

Dec. 18, 1934.  G. L. SHERWOOD ET AL  1,984,385
METHOD OF MAKING COMPOSITE METAL BEARING PLATES
Filed Nov. 5, 1931  2 Sheets-Sheet 2
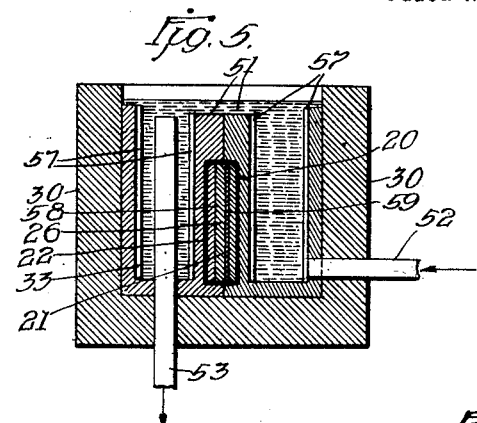
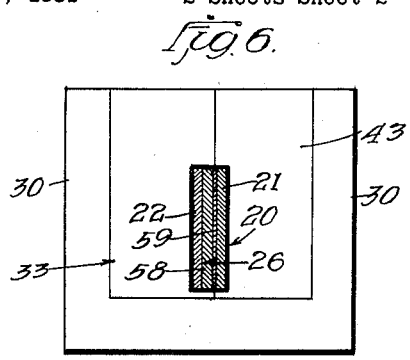
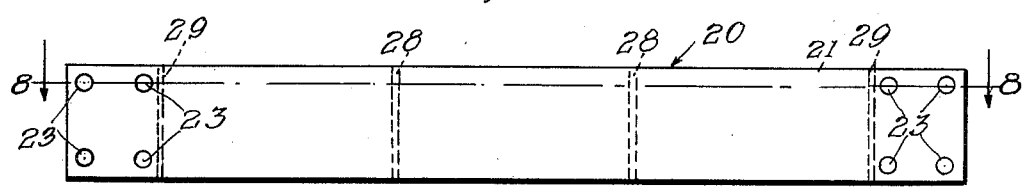
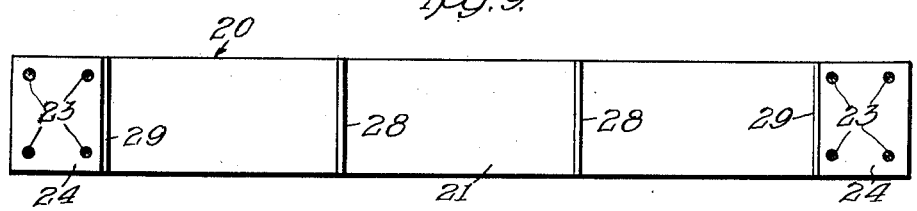
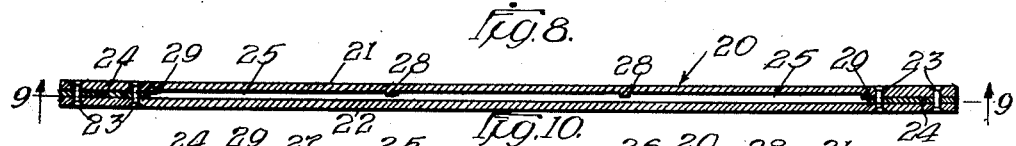
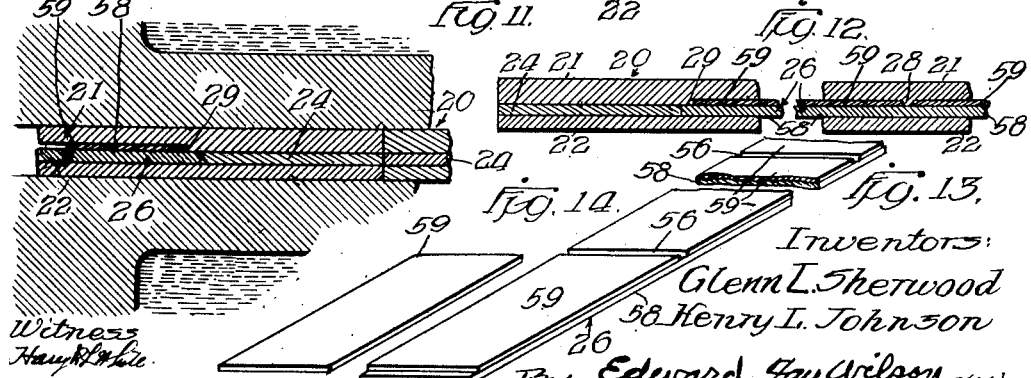
Inventors:
Glenn L. Sherwood
Henry L. Johnson
By Edward Jay Wilson Patented Dec. 18, 1934

1,984,385

UNITED STATES PATENT OFFICE 1,984,385

METHOD OF MAKING COMPOSITE METAL BEARING PLATES

Glenn L. Sherwood and Henry L. Johnson, Niles, Mich., assignors, by mesne assignments, to The Cleveland Graphite Bronze Company, Cleveland, Ohio, a corporation of Ohio Application November 5, 1931, Serial No. 573,232

5 Claims. (Cl. 22—203)

This invention relates to a novel bi-metal piece or strip for use in making bi-metal bearing sleeves; to a novel method of making such pieces; and to a novel machine and apparatus for use in making such bi-metal pieces.

The bearing sleeves, the production of which is the ultimate object of this invention, consist preferably of a back of a relatively harder, tougher metal such as steel, and a lining of bearing metal such as Babbitt metal.

The object of the invention is to provide an improved bi-metal piece or strip for use in making bi-metal bearing sleeves; to provide a novel and improved method for making such improved strips, and to provide improved apparatus and means for making such bi-metal pieces or strips.

The method includes the provision of suitable novel molds in which prepared backing metal pieces can be placed and passed through a vessel or chamber containing the bearing metal in molten condition, the chamber constituting one part of a novel apparatus for practicing the method.

In the process, the molten bearing metal fills the molds in contact with the backing metal and then the molds are passed through a cooling zone to set the bearing metal before the molds are discharged from the machine.

The machine includes a guideway for the molds, means for forcing them through the guideway to cause the molds to pass in a continuous succession through the chamber containing the molten bearing metal and through the cooling zone and then to be discharged.

The invention will be more readily understood from the following description taken in conjunction with the appended claims and by reference to the accompanying drawings in which we have illustrated an apparatus or machine best adapted for producing the flat, bi-metal plates in accordance with our improved method.

In said drawings:—

Figs. 1 and 1a constitute a top-plan view of the machine;

Fig. 2 is a transverse, vertical section on the line 2—2 of Fig. 1;

Figs. 3, 4 and 5 are transverse, vertical sections on the lines 3—3, 4—4 and 5—5, respectively, of Fig. 1a;

Fig. 6 is a transverse, vertical section on the line 6—6 of Fig. 1a;

Fig. 7 is a side view of one of the molds;

Fig. 8 is a horizontal section on the line 8—8 of Fig. 7;

Fig. 9 is a vertical section on the line 9—9 of Fig. 8, and showing a plan-view of the inner surface of one of the mold parts;

Fig. 10 is an enlarged, fragmentary section similar to Fig. 8 but showing the backing plate in position in the mold;

Fig. 11 is a fragmentary, horizontal section of the machine showing the sealing of the mold slot as the mold enters the casting chamber;

Fig. 12 is a fragmentary, horizontal section showing the completed bi-metal plate in the mold;

Fig. 13 is a fragmentary, perspective view of a bi-metal plate as produced by the method and machine; and Fig. 14 is a perspective view of a bi-metal piece adapted for use in making bi-metal bearing sleeves.

The mold 20 which forms a special feature of this invention, is rectangular in shape, as shown in Fig. 7, and may be made up of two parallel rectangular plates 21 and 22 secured together at their ends by rivets 23 with spacer plates 24 between them to hold the plates 21 and 22 spaced apart and parallel with each other and provide an elongated, rectangular mold space 25 between the plates.

The mold space 25 is arranged and adapted to receive a plate 26 to and upon which it is desired to secure a layer of bearing metal.

The plate 26 is of less thickness than the mold space, preferably, the mold space being approximately half again as thick as the plate so that when the plate is placed in the mold and in contact with the side 22 of the mold, there will be provided a relatively thin space 27 between the plate 26 and the opposite wall 21 of the mold.

Before the plates 26 are placed in the molds, they are prepared for bonding with the bearing metal, preferably, by being etched and thoroughly chemically cleaned with a suitable acid and having been washed free of acid, they are coated with a suitable flux and immersed in a suitable bonding metal such as tin.

For the purpose of retaining the plate 26 in substantial contact with the wall 22 of the mold, the wall 21 is provided with inwardly projecting ribs 28 between its end and similar projections 29 at its ends of a size to let the plate 26 be entered edgewise into the mold and hold it in position against the opposite wall 22.

As will be understood later, the ribs 28 also serve another function.

It is contemplated that quite a number of such molds be provided for passing successively through the machine.

The machine as portrayed in the drawings has a U-shaped trough or frame 30 which may be set on a work bench or provided with legs to arrange it at a suitable height for operation.

The trough 30 is elongated and serves as a base for the machine. In the trough 30, parts are arranged to provide first an entrance guide, a casting chamber, and a cooling chamber through which the molds pass successively to receive the bearing metal and to cool same preparatory to the bi-metal plates being removed from the molds.

In Figs. 1 and 1a, a top-plan view of the machine is shown, the entrance chamber being shown at 31, the chamber for applying the bearing metal at 32, and the cooling chamber at 33.

The entrance guide, as best shown in Fig. 2, consists of an upper guide 34 and a lower guide 35. These guides are spaced apart vertically and have central, longitudinal guide grooves 36 and 37, respectively, and adapted to receive and guide the molds 20 on edge as they move longitudinally through the machine.

An operated pusher 38 is provided, having a transverse pusher bar 39 arranged between the upper and lower guides 34 and 35, and arranged and adapted to engage the rear ends of the molds and push them through the machine in a continuous line. The means for moving the pusher is not shown. It will be understood that the pusher bar 39 is removed out of the way when it is desired to place a next mold in the entrance guide. The molds being placed in the machine at the left hand end, are guided longitudinally and centrally therethrough until they are discharged at the opposite end.

The guide for the molds is substantially continuous through the machine except for a break in the middle of the molten metal chamber, as shown at 40, Fig. 1a, to assure the filling of the mold space with the molten metal and the contact of the molten metal with the whole of the surface of the molds as they pass through the chamber.

The guide for the molds is made up of an entrance part 34—35, in which the pusher 39 works back and forth, the part 41 which extends through the entrance chamber 31 and to substantially the middle of the molten metal chamber 32, and the part 42 which extends from substantially the middle of the molten metal chamber 32 to the delivery end 43 of the machine.

The part 41 of the guide is made up of two sides 44 and 45, formed right and left which together, as best shown in Fig. 3, fill the trough 30 and each is provided in its middle wall 47 with a guide groove 48 together providing the guide for the molds 20 with slight clearance all around to permit the easy movement of the molds through the machine.

As best shown in Fig. 4, the guide members are separated slightly at their opposed faces, as shown at 49, in the molten metal chamber to permit the molten metal to easily enter and fill the mold spaces 25 and in contact with the steel plates 27 carried in the molds.

At the ends of the chamber 32, the guide members fill the trough and prevent the molten metal escaping.

As the molds pass into the chamber 32, the molten metal fills the mold space 25 and would leak out through this space but for the reason that the molds are cool enough at this point to chill and harden the molten metal in the mold slot. This hardened metal closes the mold slot as it passes the entrance to the metal chamber 32 and prevents any escape of the molten metal.

As the mold passes on through the chamber 32, the mold gradually becomes hot enough especially as it passes the middle opening 40 to melt the hardened bearing metal and the whole mold space becomes filled with molten metal. It should be understood that the chamber 32 is kept continuously supplied with molten bearing metal to a sufficient depth, as indicated at 50, Fig. 4, to fully immerse not only the molds but also the separated guides 44 and 45.

As the molds pass from the molten metal chamber 32 to the cooling chamber 33, the molds are cooled and the bearing metal therein hardens and serves as a stop at this end of the chamber to prevent the escape of the molten metal.

In the chamber 33 the molds pass through a long closed guide 51 and a suitable cooling means is provided to keep the guide 51 cool enough to solidify the bearing metal before the molds reach the delivery end 43.

The means for cooling the guide 51 may be a circulation of a cooling medium through the chamber as indicated by a supply pipe 52 and an overflow pipe 53, or water may be continuously sprayed upon the guide 51.

At each end of the molten metal chamber 32 the guides 41 and 42 are provided with insulation pockets 54 to prevent the heat of the molten metal traveling along the machine to any unwanted extent.

Heating means such as gas burners indicated at 55 may be arranged below the chamber 32.

After the molds have been discharged from the machine the plates 26 with the cast-on bearing metal are pushed edgewise from the molds.

The ribs 28 in the mold which serve to hold the plate 26 against the opposite wall also form transverse grooves 56 in the bearing metal on the plates and show where the plate can be severed to form pieces 59 of a size to make the desired half-cylindrical bearing sleeves which are the ultimate object of the invention.

After the composite plate has been cut into pieces, the pieces are formed into half-cylindrical bearings by the pressure method preferably by the method disclosed in the co-pending application filed by Sherwood et al, April 16, 1931, Serial No. 480,030.

To facilitate the cooling of the molds as they pass through the cooling chamber, the walls of the chamber may be provided with vertical heat radiating ribs 57.

The pieces 55 each consist of a piece 58 of the metal plate 26 and a layer 59 of the Babbitt metal.

The plate 58 forms the back or shell of a bearing sleeve and the Babbitt metal 59 forms the lining.

As many modifications of the invention will readily suggest themselves to one skilled in the art, the invention is not limited to the specific sequence of steps or to the specific details of construction and arrangement herein shown and described.

We claim:

1. The herein described method of producing bi-metal plates for use in making bi-metal bearing sleeves, and which consists in providing a plurality of molds in which the back parts of the sleeves are held in flat condition with mold spaces in front of the back plates, passing the molds in succession and in end to end relation into and out of a chamber containing molten bearing metal and below the surface thereof, the cool molds solidifying the molten metal in the mold spaces as the molds enter the chamber and thereby preventing the escape of the molten metal therethrough.

2. The invention as defined in claim 1, the molds passing through an elongated closed guide in leaving the chamber and wherein they are cooled sufficiently to solidity the bearing metal carried thereby and thus prevent the escape of molten metal at the point of egress.

3. A continuous method of making composite bearing metal plates comprising the steps of providing a strip of bearing backing metal, superimposing a strip of heat-resisting metal on said strip whereby to define exposed areas on the latter substantially equivalent to the area of a finished bearing, and then longitudinally passing said strips through a bath of molten bearing metal.

4. A continuous method of making composite bearing metal plates comprising the steps of providing a strip of bearing backing metal, superimposing a strip of heat-resisting metal on said strip whereby to define exposed areas on the latter substantially equivalent to the area of a finished bearing, longitudinally passing said strips through a bath of molten bearing metal, and then cooling said strips upon extraction from said bearing metal bath.

5. A continuous method of making composite bearing metal plates comprising the steps of providing a strip of bearing backing metal, superimposing a strip of heat-resisting metal on said strip whereby to define exposed areas on the latter substantially equivalent to the area of a finished bearing, longitudinally passing said strips through a bath of molten bearing metal, cooling said strips upon extraction from said bearing metal bath, and then separating said heat resisting strip from the resultant composite metal strip.

GLENN L. SHERWOOD.
HENRY L. JOHNSON.